(12) United States Patent
Chan et al.

(10) Patent No.: US 10,642,987 B2
(45) Date of Patent: May 5, 2020

(54) CRYPTOGRAPHY BASED FRAUD TRACKING

(71) Applicant: eBay Inc., San Jose, CA (US)

(72) Inventors: Michael Chan, Cupertino, CA (US); Nikhil Firke, San Ramon, CA (US); Todd Ryan Palmer, Livermore, CA (US); Brian Peter Dickson, San Jose, CA (US); Julien Soriano, San Jose, CA (US); Ralph Forsythe, San Jose, CA (US)

(73) Assignee: eBay Inc., San Jose, CA (US)

( * ) Notice: Subject to any disclaimer, the term of this patent is extended or adjusted under 35 U.S.C. 154(b) by 141 days.

(21) Appl. No.: 15/410,139

(22) Filed: Jan. 19, 2017

(65) Prior Publication Data
US 2018/0204013 A1    Jul. 19, 2018

(51) Int. Cl.
*G06F 21/00* (2013.01)
*G06F 21/60* (2013.01)
(Continued)

(52) U.S. Cl.
CPC .......... *G06F 21/602* (2013.01); *G06F 21/552* (2013.01); *G06Q 20/12* (2013.01); *G06Q 20/385* (2013.01); *G06Q 20/38215* (2013.01); *G06Q 20/4016* (2013.01); *H04L 9/0822* (2013.01); *H04L 9/3247* (2013.01); *G06F 2221/2101* (2013.01); *G06F 2221/2107* (2013.01)

(58) Field of Classification Search
CPC ............. G06F 21/602; H04L 2463/041; H04L 63/0442; H04L 9/0618; H04L 9/06
See application file for complete search history.

(56) References Cited

U.S. PATENT DOCUMENTS 6,820,204 B1    11/2004 Desai et al.
6,931,532 B1    8/2005 Davis et al.
(Continued)

FOREIGN PATENT DOCUMENTS

WO    2018/136704 A1    7/2018

OTHER PUBLICATIONS

"Block cipher mode of operation" Wikipedia Jan. 16, 2016.*
(Continued)

*Primary Examiner* — Joseph P Hirl
*Assistant Examiner* — Ka Shan Choy
(74) *Attorney, Agent, or Firm* — Newport IP, LLC; Han K. Gim

(57) ABSTRACT

A cryptographic tracking engine is disclosed that can track a user's data over the Internet in a way that allows the user to maintain control over the data downstream while maintaining the security of the stored data. An online entity provides an identifier that is encrypted using a first mechanism. Further, the user provides a data item for an electronic communication between two users. The data item is encrypted using the first mechanism. The data encrypted using the first mechanism is stored in a cryptographic entry. Other data for the electronic communication between the a first and second user is encrypted using a second encryption mechanism, such as a block cipher. The user can then selectively expose data stored in the cryptographic entry on a block-by-block basis to track exchanges of data over the Internet.

20 Claims, 12 Drawing Sheets

(51) Int. Cl.
*G06Q 20/38* (2012.01)
*G06Q 20/12* (2012.01)
*G06Q 20/40* (2012.01)
*H04L 9/08* (2006.01)
*H04L 9/32* (2006.01)
*G06F 21/55* (2013.01)

(56) References Cited

U.S. PATENT DOCUMENTS

| | | | |
|---|---|---|---|
| 9,635,011 B1* | 4/2017 | Wu | H04L 63/0807 |
| 2003/0023851 A1 | 1/2003 | Peha | |
| 2008/0181409 A1* | 7/2008 | Wang | H04L 9/00 |
| | | | 380/277 |
| 2010/0185864 A1 | 7/2010 | Gerdes et al. | |
| 2012/0066756 A1 | 3/2012 | Vysogorets et al. | |
| 2012/0191615 A1 | 7/2012 | Schibuk | |
| 2014/0074719 A1 | 3/2014 | Gressel et al. | |
| 2017/0214521 A1* | 7/2017 | Busch | H04L 9/0618 |
| 2017/0235967 A1* | 8/2017 | Ray | G06F 21/6218 |
| | | | 713/165 |
| 2018/0176193 A1* | 6/2018 | Davis | H04L 9/3247 |

OTHER PUBLICATIONS

International Search Report received for PCT Application No. PCT/US2018/014361, dated May 30, 2018, 2 pages.

Written Opinion received for PCT Application No. PCT/US2018/014361, dated May 30, 2018, 5 pages.

Extended European Search Report Received for European Patent Application No. 18741263.0, dated Oct. 23, 2019, 13 pages.

International Preliminary Report on Patentability received for PCT Patent Application No. PCT/US2018/014361, dated Aug. 1, 2019, 7 pages.

Arasu et al., "Transaction Processing on Confidential Data Using Cipherbase" In: Tech. Rep. MSR-TR-2014-1 06, Microsoft, XP055627267, Aug. 1, 2014, 15 pages.

Hicks, "Cryptography in SOL Server | Microsoft Docs", Retrieved from the Internet: URL:https://docs.microsoft.com/en-us/previous-versions/sql/sqlserver-2008/cc837966(v=sql.1 OO)?redirectedfrom=MSDN [retrieved on Sep. 30, 2019] XP055627192, Apr. 9, 2009, 34 pages.

* cited by examiner

| Date/time | CVC | Agent | Item(s) | Signatures | Email | Status |
|---|---|---|---|---|---|---|
| [MASKED]: J?9? @?%<N5 | [MASKED]: ON<?_Y?! u | [MASKED]: P?⁊75.ck0?! N?Ev? | [MASKED]: ?Me??3m??? ??<??#!?V?? ?7! | [MASKED]: !???⁊\⸘y?b | [MASKED]: #д⸘?W?˙ | Comp. |
| [MASKED]: ???.q? | [MASKED]: L?8L.w?!? ⸘x???!? | [MASKED]: 3!??K???⁊@ %?:? | [MASKED]: Kb⸘˙⁊A??9?? ?8??()?:=s? | [MASKED]: ??{???E#?⁊? nɟ-XF | [MASKED]: ?⸜?????˙ | Reg. |

FIG. 4

| Date/ time | CVC | Agent | Item(s) | Signatures | Email | Status |
|---|---|---|---|---|---|---|
| [MASKED]: J?.9? @?%<N6 | [MASKED]: ON<?_Y?! u | [MASKED]: ??..?5.ckO?` N?Ev? | [MASKED]: ?Me??3m??? ??<??#!?yV?! ?7! C0 | [MASKED]: !???\!.Jy?b C1 | [MASKED]: #4.%?W?` C2! | Comp. |

CRYPTOGRAPHY BASED FRAUD TRACKING

TECHNICAL FIELD

Embodiments of the present disclosure relate generally to tracking data and, more particularly, but not by way of limitation, to monitoring and tracking user data downstream using cryptographic mechanisms.

BACKGROUND

One of the barriers for transferring data online is gaining a user's trust. For example, once a user gives an online entity data (e.g., financial data), there is very little the user can do to control the downstream use of the data. This loss of control results in many users avoiding webstores or other online sites (e.g., interacting instead with brick and mortar stores). One approach for increasing online trust is storing data in large data stores for analysis. However, such data stores are vulnerable to hacking. Once the data store is hacked, not only is the user's data made available to malicious users, but commonly the user's private data (e.g., physical address, email address, passwords, transactional history) is also publically disclosed. It is to these issues the following disclosure is directed.

BRIEF DESCRIPTION OF THE DRAWINGS

Various ones of the appended drawings merely illustrate example embodiments of the present disclosure and should not be considered as limiting its scope.

FIG. 4 shows a cryptographic data structure, according to some example embodiments.

FIG. 5B illustrates an example cryptographic entry with ciphertext values, according to some example embodiments.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In various example embodiments, a cryptographic fraud engine is implemented to track an end-user's data in a way that allows the user to maintain control over the data downstream while maintaining the security of the data store. In some example embodiments, a online entity provides an identifier that is encrypted using a first mechanism. Further, a user provides data, which is also encrypted using the first mechanism. The data encrypted using the first mechanism is stored in a cryptographic entry (e.g., row of a table) for later analysis. Further, electronic communication data for an electronic communication between the user and online entity is encrypted using a second encryption mechanism that is different than the first encryption mechanism. An example of electronic communication between two users include a purchase transaction for an item over the Internet. For example, the first user may be a seller or agent of an online entity (e.g., website store) that publishes a listing of the item for sale. The second user may be a buyer of the item for sale through the online entity via an exchange of purchase data, as described in further detail below. An additional example of an electronic communication includes an exchange of electronic messages (e.g., email, SMS texts) over a network (e.g., TCP-IP based network, LTE based network).

The electronic communication data encrypted with the second mechanism is also stored in the cryptographic entry. In some embodiments, the second mechanism is a block-based mechanism (e.g., block-cipher) that allows the user to selectively allow electronic communication data, the identifier, or the user data to be exposed without weakening the cryptographic data structure that stores the cryptographic entries.

Figure 1:
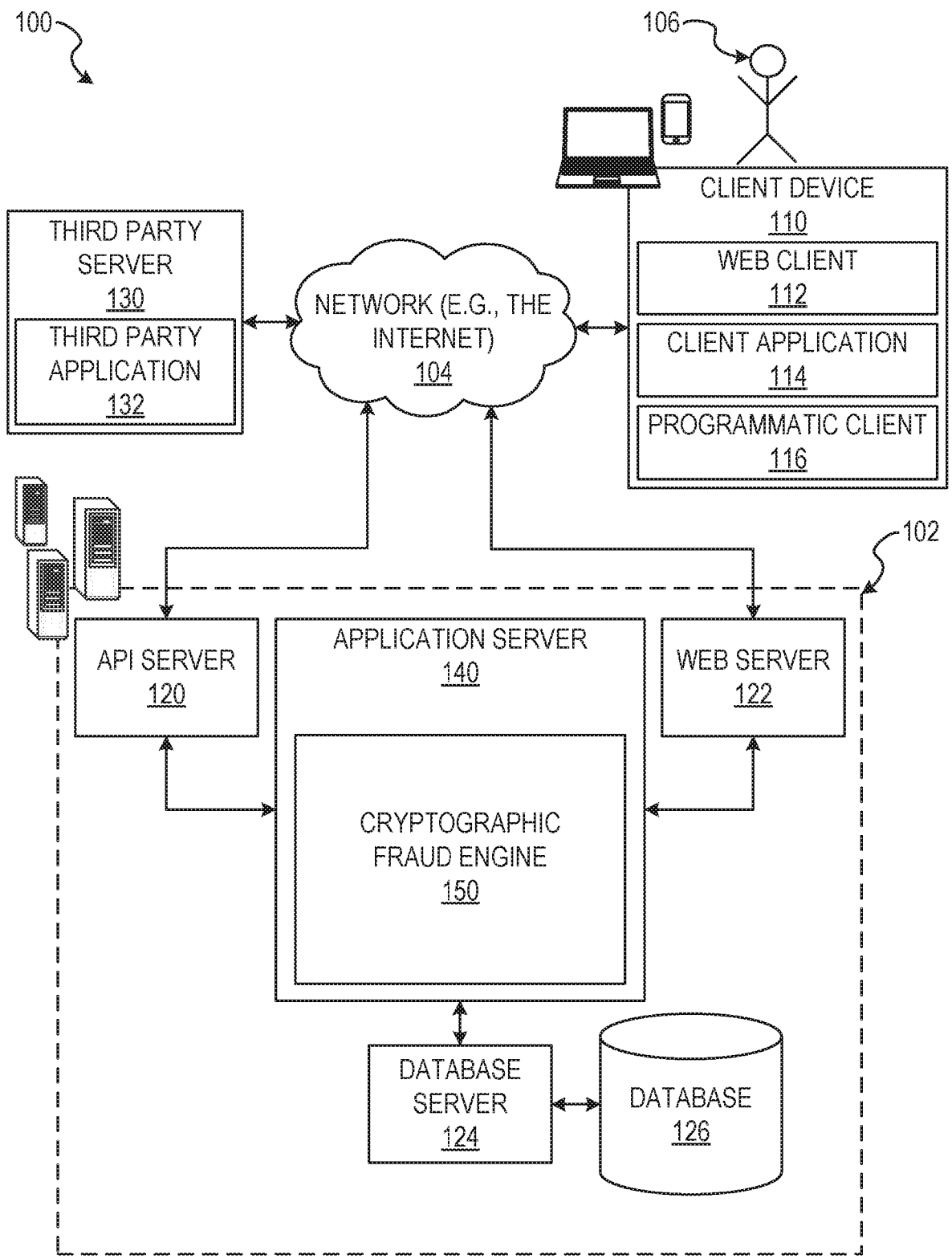
FIG. 1 is a block diagram illustrating a cryptographic fraud engine implemented in a networked system, according to some example embodiments.

With reference to FIG. 1, an example embodiment of a high-level client-server-based network architecture 100 is shown. A networked system 102, in the example forms of a network-based publication system, provides server-side functionality via a network 104 (e.g., the Internet or wide area network (WAN)) to one or more client devices 110. In some implementations, a user (e.g., user 106) interacts with the networked system 102 using the client device 110. FIG. 1 illustrates, for example, a web client 112 (e.g., a browser), applications 114, and a programmatic client 116 executing on the client device 110. The client device 110 includes the web client 112, the client application 114, and the programmatic client 116 alone, together, or in any suitable combination. Although FIG. 1 shows one client device 110, in other implementations, the network architecture 100 comprises multiple client devices.

In various implementations, the client device 110 comprises a computing device that includes at least a display and communication capabilities that provide access to the networked system 102 via the network 104. The client device 110 comprises, but is not limited to, a remote device, work station, computer, general purpose computer, Internet appliance, hand-held device, wireless device, portable device, wearable computer, cellular or mobile phone, personal digital assistant (PDA), smart phone, tablet, ultrabook, netbook, laptop, desktop, multi-processor system, microprocessor-based or programmable consumer electronic, game consoles, set-top box, network personal computer (PC), minicomputer, and so forth. In an example embodiment, the client device 110 comprises one or more of a touch screen, accelerometer, gyroscope, biometric sensor, camera, microphone, Global Positioning System (GPS) device, and the like.

The client device 110 communicates with the network 104 via a wired or wireless connection. For example, one or more portions of the network 104 comprises an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wireless Fidelity (WI-FI®) network, a Worldwide interoperability for Microwave Access (WiMax) network, another type of network, or any suitable combination thereof.

In some example embodiments, the client device 110 includes one or more of the applications (also referred to as "apps") such as, but not limited to, web browsers, book reader apps (operable to read e-books), media apps (operable to present various media forms including audio and video), fitness apps, biometric monitoring apps, messaging apps, electronic mail (email) apps. In some implementations, the client application 114 includes various components operable to present information to the user 106 and communicate with networked system 102.

The web client 112 accesses the various components of the networked system 102 via the web interface supported by a web server 122. Similarly, the programmatic client 116 and client application 114 access the various services and functions provided by the networked system 102 via the programmatic interface provided by an application program interface (API) server 120.

Users (e.g., the user 106) comprise a person, a machine, or other means of interacting with the client device 110. In some example embodiments, the user 106 is not part of the network architecture 100, but interacts with the network architecture 100 via the client device 110 or another means. For instance, the user 106 provides input (e.g., touch screen input or alphanumeric input) to the client device 110 and the input is communicated to the networked system 102 via the network 104. In this instance, the networked system 102, in response to receiving the input from the user 106, communicates information to the client device 110 via the network 104 to be presented to the user 106. In this way, the user 106 can interact with the networked system 102 using the client device 110.

The API server 120 and the web server 122 are coupled to, and provide programmatic and web interfaces respectively to, one or more application servers 140. The application server 140 can host a cryptographic fraud engine 150, which can comprise one or more modules or applications, each of which can be embodied as hardware, software, firmware, or any combination thereof. The application server 140 is, in turn, shown to be coupled to a database server 124 that facilitates access to one or more information storage repositories, such as database or data store 126. In an example embodiment, the database 126 comprises one or more storage devices that store information to be accessed by cryptographic fraud engine 150 or client device 110.

Additionally, a third party application 132, executing on third party server 130, is shown as having programmatic access to the networked system 102 via the programmatic interface provided by the API server 120. For example, the third party application 132, utilizing information retrieved from the networked system 102, to perform investigative analysis of data managed by the cryptographic fraud engine 150.

Further, while the client-server-based network architecture 100 shown in FIG. 1 employs a client-server architecture, the present inventive subject matter is, of course, not limited to such an architecture, and can equally well find application in a distributed, or peer-to-peer, architecture system, for example. The various systems of the application server 140 (e.g., the cryptographic fraud engine 150) can also be implemented as standalone software programs, which do not necessarily have networking capabilities.

Figure 2:
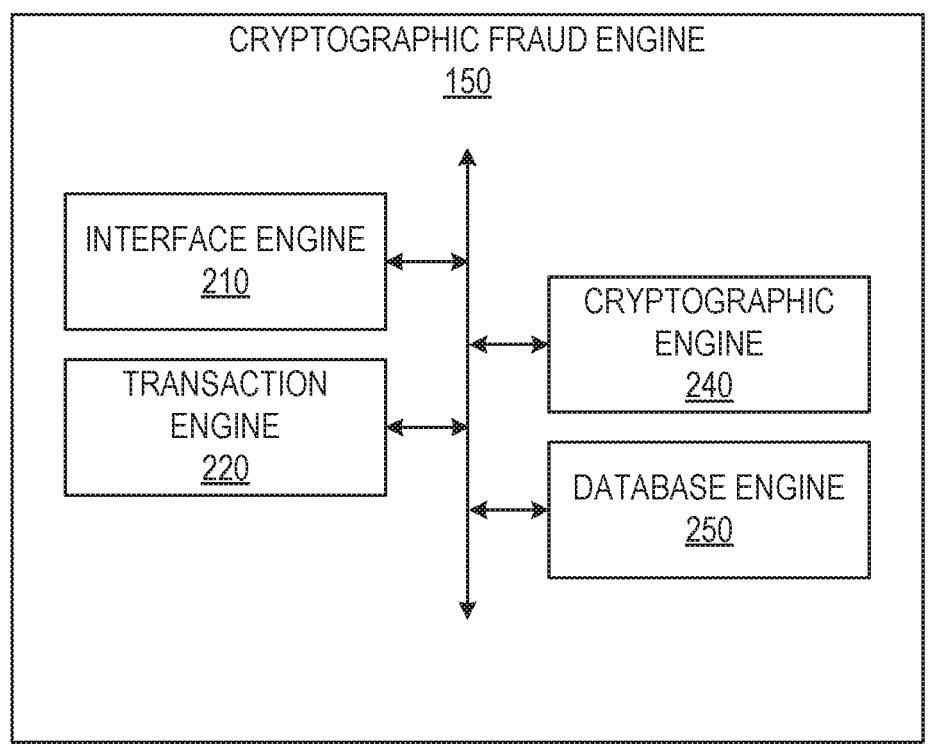
FIG. 2 is a block diagram showing example functional components provided within the cryptographic fraud engine, according to some example embodiments.

FIG. 2 illustrates internal functional components of the cryptographic fraud engine 150, according to some example embodiments. The components themselves are communicatively coupled (e.g., via appropriate interfaces) to each other and to various data sources, so as to allow information to be passed between the components or so as to allow the components to share and access common data. In some example embodiments, the components access the database 126 via the database server 124. Further, although the components are illustrated as being integrated into the server side (e.g., run from the application server 140), in some example embodiments, the functional components are integrated and run from a client device, such as client device 110.

As illustrated in FIG. 2, the example cryptographic fraud engine 150 comprises an interface engine 210, a transaction engine 220, a cryptographic engine 240, and a database engine 250. The interface engine 210 is responsible for receiving requests from client devices, such as client device 110. The transaction engine 220 manages transactions for items published on a network-publishing platform. The items published on the network-publishing platform can be part of a transaction from which transaction data discussed below is generated, according to some example embodiments. The transaction data may be stored and later used for analysis via the cryptographic fraud engine 150.

The cryptographic engine 240 is responsible for encrypting different pieces of data to generate a cryptographic entry for inclusion in a cryptographic data structure, as discussed in further detail below. The database engine 250 is configured to interface with a database, such as database 126, to store and retrieve records, such as cryptographic entries stored in the cryptographic data structure.

Figure 3:
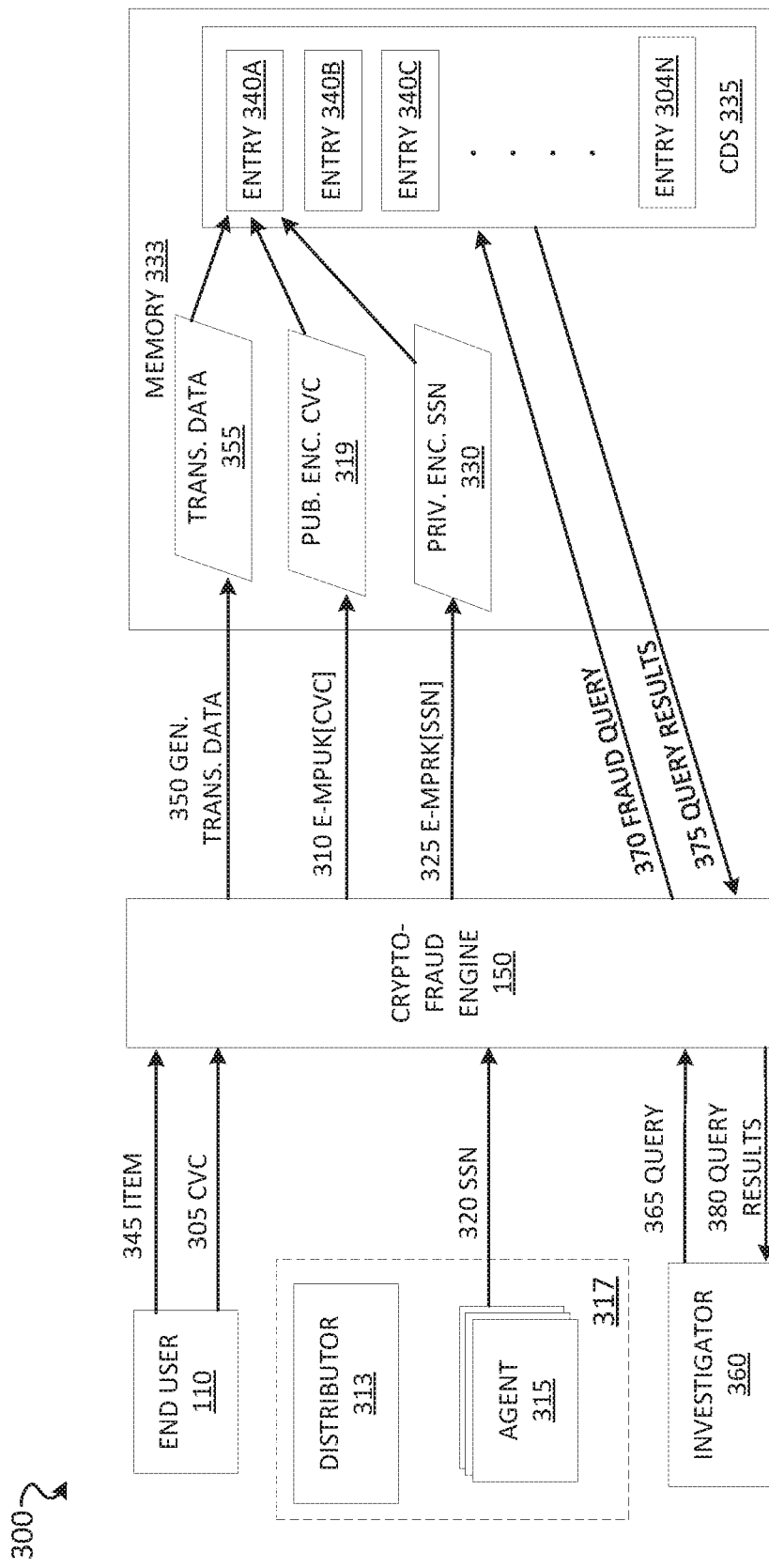
FIG. 3 shows an architecture for implementing a cryptographic fraud engine 150, according to some example embodiments.

FIG. 3 shows an architecture 300 for implementing a cryptographic fraud engine 150, according to some example embodiments. In the example illustrated in FIG. 3, an end-user is attempting to purchase an item from a website 317 accessed via a cryptographic fraud engine 150, which can be provided as a network platform that hosts a web store or website 317. The website 317 is managed by a distributor 313, who buys inventory and makes it available for purchase through the website. For example, the cryptographic fraud engine 150 can be part of an eBay network platform, and the website 317 can be a web-store for the distributor 313. In some embodiments, the web-store is generally a trusted entity in that background checks and lines of credit or collateral have been performed and/or verified as part of a registration process for the website 317. This increases the trust of the end-user in the website 317. Without said trust, end-user may not shop online and may opt for physical "brick-and-mortar" stores.

In some cases, for example where the website 317 is successful, has a large inventory, and keeps track of many orders, the distributor may employ one or more agents, such as agent 315, to perform tasks, such as order fulfillment, web support, IT support, or customer service. While the end-user generally trusts the distributor 313, the end-user may not trust the agent 315. Alternatively, for example, if the end-user does generally trust the agent 315, the user 106 still desires a way for the end-user's data (e.g., payment and personal data) to be controlled downstream (e.g., in a trackable way that keeps all parties that handle the end-user's data accountable). The cryptographic fraud engine 150 provides a mechanism for tracking which entities have handled the end-user's sensitive data in a way that is network efficient and that maintains privacy for involved parties.

In some example embodiments, the end-user first registers with the website 317 through the cryptographic fraud engine 150. The end user may send one or more payment account data items, such as a CVC of a credit card, to the cryptographic fraud engine 150, as illustrated at operation 305. In other example embodiments, such as those involving messaging, the data item of operation 305 is a sensitive or confidential data item, e.g., confidential data, private data.

The cryptographic fraud engine 150 then encrypts the payment account data item for storage. For example, the cryptographic fraud engine 150 may use a public key of an asymmetric key pair to encrypt the payment data account item, as illustrated at 310. The encrypted payment account item 319 is then stored within a memory accessible to the cryptographic fraud engine 150, such as memory 333.

Continuing, when the agent 315 is hired by the distributor 313, the agent 315 generally provides one or more personal identifiers, such as a social security number (SSN). The distributor 313 may use the agent's personal identifiers to perform background checks on the agent 315. Further, the agent 315 may be required to have his/her identifier (e.g., SSN, employee number, name) transmitted to the cryptographic fraud engine 150 for record keeping. In particular, according to some example embodiments, at operation 320, the distributor 313 sends the agent 315's identifier (e.g., SSN) to the cryptographic fraud engine 150. The cryptographic fraud engine 150 then encrypts the identifier for storage. For example, at operation 325, the cryptographic fraud engine 150 encrypts the agent 315's identifier with the private key from the asymmetric key pair. The encrypted agent 315's identifier is then stored within a memory accessible to the cryptographic fraud engine 150, such as the memory 333.

In some example embodiments, a program can take the place of the agent in the above processes. In those example embodiments, the machine identifier (ID) and software version can be used as a unique identifier for that machine, in place of a personal identifier (e.g., SSN).

Continuing, the end-user desires to purchase an item from the website 317 via the cryptographic fraud engine 150. At operation 345, the client device 110 of the end user 106 submits transaction data. For example, at operation 345, the end-user fills out shipping data, agrees to pay a specified price using a credit account linked to the CVC, and places the order. At operation 350, the cryptographic fraud engine 150 receives the transaction data and stores it as transaction data 355. In some example embodiments, the cryptographic fraud engine 150 uses a block cipher to encrypt the transaction data, and stores the transaction data 355 in encrypted form (e.g., a collection of cipher-texts). Further, the cryptographic fraud engine 150 may combine the transaction data 355 with the encrypted payment account item 319 and the encrypted agent identifier 330 to generate a cryptographic entry 340A, which is stored in a cryptographic data structure 335 in the memory 333, according to some example embodiments. In some example embodiments, the client device 110 of the end user 106 is configured to perform the above encryption of the transaction data to generate the encrypted transaction data 355 on the client side (e.g., on the client device 110). In those example embodiments, after the encrypted transaction data 355 is generated, the client device 110 transmits the encrypted transaction data 355 to the cryptographic fraud engine 150 for storage in the cryptographic data structure 335.

Further, in some example embodiments, the distributor 313 may cipher the agent's social security number to produce the encrypted agent identifier 330. For example, the distributor 313 may perform a background check on the agent 315; after successful completion of the background check, the distributor 313 then uses the SSN of the agent 315 to generate the encrypted agent identifier 330. In those example embodiments, after the distributor 313 generates the encrypted agent identifier 330, the distributor 313 transmits the encrypted agent identifier 330 to the cryptographic fraud engine 150 for storage in the cryptographic data structure 335, according to some example embodiments. As illustrated, the cryptographic data structure 335 may comprise a plurality of cryptographic entries 340A-N, each of which may store data for the transaction, payment account data, or the agent identifier, as described above. Further, in some example embodiments, after the distributor 313 generates the encrypted agent identifier 330 the distributor 313 may further sign the encrypted agent identifier 330, thereby binding the distributor 313 to the record.

In some example embodiments, after the cryptographic fraud engine 150 generates the encrypted agent identifier 330, the encrypted agent identifier 330 is then transmitted back to the agent 315 for the user as his/her identifier in transactions. Similarly, after the cryptographic fraud engine 150 generates the encrypted payment account data item, the payment account data item is transmitted pack to the end-user for payment use. As an illustrative example, assume that the end-user is interacting directly with the agent 315 to perform the transaction. To initiate the transaction, the agent 315 and the end-user exchange the encrypted items. That is, the agent 315 transmits the encrypted agent identifier 330 to the end-user, and the end-user transmits the encrypted payment account item 319 to the agent 315. At this point, the agent 315 cannot defraud the end-user using the end-user's payment account data, since what the agent 315 has received is an encrypted CVC and the banking institution that granted the CVC needs the CVC number to clear a payment, not a cipher-text of the CVC.

To proceed with the transaction, the agent 315 transmits the encrypted payment account item 319 to the cryptographic fraud engine 150. The cryptographic fraud engine 150 receives the encrypted payment account item 319 and decrypts it using the private key to expose the CVC. The cryptographic fraud engine 150 can then clear the payment for the item. It is appreciated that the above processes are performed programmatically through the client devices 110 of the end-user and agent 315. For example, the client device 110 of the end-user submits the encrypted payment account item 319 by clicking "Pay Now," on a website managed by the agent 315. The website 317 then relays the payment request to the cryptographic fraud engine 150 for payment clearance.

Assume, at a point in time after the transaction is complete, the end-user discovers fraudulent activity on his/her account (e.g., account associated with the CVC). In some example embodiments, the end-user can then submit the encrypted agent identifier 330 to the cryptographic fraud engine 150, which can perform a look-up to see which agent corresponds to the encrypted agent identifier 330. Alternatively, the encrypted agent identifier 330 can decrypt the encrypted agent identifier 330 using the public key to expose then identifier (e.g., SSN) of the agent 315, thereby identifying the agent 315.

In some example embodiments, when the cryptographic fraud engine 150 receives notification from the end-user of potential fraudulent activity, an investigative user, such as investigator 360 (e.g., a human investigator using an interfacing client deice), can access the cryptographic fraud engine 150 to perform analysis and track down the source or perpetrator of fraudulent activity. For example, the investigative user 360 can submit a query 365 to the cryptographic fraud engine 150 for details regarding transactions of the end-user. The cryptographic fraud engine 150 receives the query 365, and configures a fraud query 370, which is specially configured to decrypt specified fields of the cryptographic entry 340A. For example, the fraud query 370 can selectively decrypt the payment amount, an item identifier, a transaction data item, or the agent user identifier (e.g., SSN, or encrypted SSN). The decrypted results are then returned as query results at operations 375, which are then transmitted to the investigator 360 for display and analysis in operation 380.

In some example embodiments, transactions are identified through matching a hash generated using a transaction ID and a hash scheme, such as a Secure Hash Algorithm (e.g., SHA256). For example, the distributor 313 and the end user 106 may be using a transaction ID that identifies the transaction. The distributor 313 may generate a hash of the transaction ID and transmit it to the client device 110 of the end user 106. When the client device 106, the agent 315 or the distributor 313 transmit a message containing sensitive information (e.g., payment details, SSNs) to the cryptographic fraud engine 150, the message can include the hash of the transaction ID. The cryptographic fraud engine 150 can receive communications from two entities and then match the hashes to determine that the two entities are in fact the end user 110 and a entity of the website 317 (e.g., distributor 313 or agent 315).

FIG. 4 shows a cryptographic data structure 400, according to some example embodiments. As illustrated, the example cryptographic data structure 400 comprises two rows: cryptographic entry 405 and cryptographic entry 410. Each cryptographic entry corresponds to an individual transaction between the end-user and an online entity (e.g., distributor 313, agent 315). The schema of the cryptographic data structure 400 comprises a plurality of columns; each column corresponds to a type of transactional data recorded for the entries. As illustrated, the columns comprise a date/time column, a payment account data item column (e.g., CVC, 16-digit credit card number, banking account number, routing number), an agent identification column, item column, a signatures data column, an end-user email column, and a status column, according to some example embodiments. It is appreciated that additional columns can be added and one or more of the existing columns omitted per different types of records to be tracked via the cryptographic data structure 400. For example, other types of records, such as, medical records and human resources records, can be tracked in a similar manner to the example discussed herein. In particular, for instance, the end-user can be a patient, his/her sensitive data can be medical information instead of the payment account data item (e.g., CVC), and the agent 315 can be a receptionist at a hospital, who may likewise use his/her identifier (e.g., SSN, employee number) to create a hashed value (e.g., encrypted agent identifier) to serve as an identifier and tracking means in the cryptographic data structure 400.

In some example embodiments, each column is decrypted using a block cipher, such as advanced encryption standard in block cipher counter mode (AES-CTR). AES-CTR can be implemented to ensure the privacy and confidentiality of the user's information. In particular, for example, by encrypting each column using AES-CTR, the amount of data later decrypted for an investigation can be controlled per the end-user's instructions, as discussed in further detail below. Further, in some example embodiments, Advanced Encryption standard Galois Counter Mode (AES-GCM) can be implemented instead of AES-CTR to ensure data integrity.

In some example embodiments, the encrypted payment account item 319 and the encrypted agent identifier 330 are encrypted using a first mechanism (e.g., asymmetric keys as discussed above), and then the entire row is encrypted using a second mechanism, such as a block cipher (e.g., AES-CTR). By using two types of encryption, parties to a transaction can more readily be referenced using the first encryption mechanism, and the actual specific data of the transaction (e.g., items, price) can be later be selectively decrypted using the second encryption mechanism.

Figure 5A:
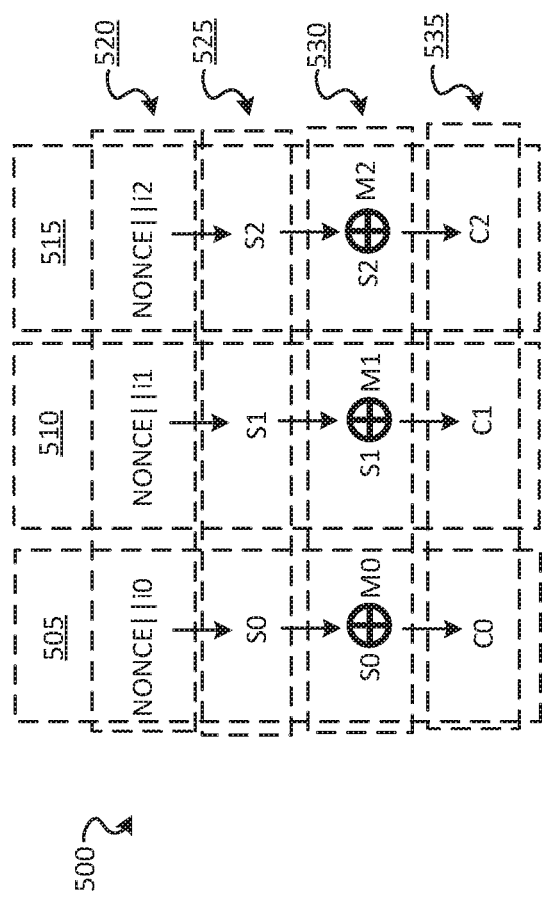
FIG. 5A illustrates an architecture for encrypting the columns of the cryptographic data structure, according to some example embodiments.

FIG. 5A illustrates an architecture 500 for encrypting the columns of the cryptographic data structure 400, according to some example embodiments. Each column of the architecture 500 corresponds to an item of data to be encrypted in a cryptographic entry. For instance, the output of column 505 of FIG. 5A is ciphertext C0, which is further illustrated in FIG. 5B. Similarly, the output of column 510 of FIG. 5A is ciphertext C1, which is further illustrated in FIG. 5B. Similarly, the output of column 515 of FIG. 5A is ciphertext C2, which is further illustrated in FIG. 5B. Each row of architecture corresponds to one or more operations performed by the cryptographic engine 240.

As an illustrated example, at operation 520 a nonce (e.g., arbitrary number used once) is concatenated with a counter value for each column (e.g., i0, i1, i2). In some example embodiments, the nonce and the counter value are both 64 bits in length. At operation 525, the nonce and counter values input into a cipher block, such as AES, to generate scrambled values, s0, s1, s2, which are the encrypted values of the data inputs. At operation 530, the scrambled values are XOR'd with the message values, m0, m1, and m2. The scramble values are stored for later selected decryption, as discussed in further detail in FIG. 6B, according to some example embodiments.

The message values are the underlying transaction data values to be encrypted. For example, the message value m0 can be an English description of the item being purchased, the message value m1 can be signature data for the end-user agreeing to buy the item, and message value m2 can be the email address of the end-user. At operation 535, the ciphertext values, c0, c1, and c2 are stored in a cryptographic entry (e.g., cryptographic entry 405).

As illustrated in FIG. 5B, in some example embodiments, the operations 520, 525, 530, and 535 can be performed in parallel due to the counter values, i0, i1, and i2, not being dependent on one another (e.g., i0=1, i1=2, and so on, such that each i'th value is known and does not need the i−1'th value to be generated first). By performing the counter-based operations (e.g., operations 520, 525, 530, and 535) in parallel, the cryptographic fraud engine 150 can efficiently generate ciphertexts for cryptographic entries very quickly. In this way, the cryptographic fraud engine 150 can provide a cryptographically secure way of tracking sensitive data between users.

In addition to allowing the end-user to specify which cells or columns of data to decrypt, the block-cipher approach is also more secure because the message text of the transaction data can be exposed without creating a weakness in the cryptographic strength of the cryptographic entry. In particular, for example, if the user 106 specifies that that only message text M0 should be decrypted and sent to the investigator 360, then the cryptographic fraud engine 150 XOR's the ciphertext C0 with the scrambled value S0 to generate the message text M0. Notably, this process occurs without exposing the initialization vector (e.g., nonce value) thereby maintaining the cryptographic strength of the cryptographic data structure 400. To further increase security, each cryptographic entry in each row receives a different nonce value. That is, each column value in cryptographic entry 405 uses a first nonce value, and each column value in cryptographic entry 410 uses a second nonce value, and so on.

Additionally, according to some embodiments, one or more entire rows of cryptographic entries are transmitted to the investigative user (e.g., investigator 360) for storage and analysis. For example, upon potential fraudulent activity occurring or being reported (e.g., reported by the user), the entire cryptographic data structure 400 may be sent to the investigative user along with specific scramble values so that the investigative user can decrypt the specific cells of data using the scramble values via XOR.

Figure 6A:
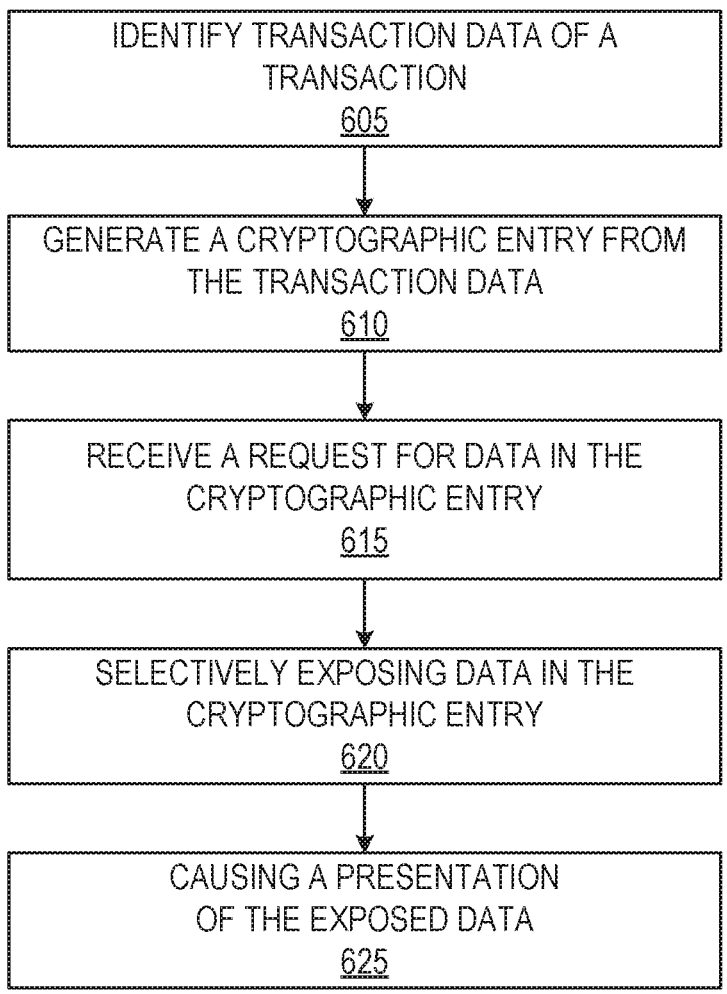
FIG. 6A illustrates a flow diagram for a method implementing the cryptographic fraud engine using queries, according to some example embodiments.

FIG. 6A illustrates a flow diagram for a method 600 of implementing the cryptographic fraud engine 150 using queries, according to some example embodiments. In the example process of method 600, the cryptographic entry is created and the investigative user access the cryptographic fraud engine 150 via a web session to submit queries and receive responses. At operation 605, the cryptographic engine 240 identifies transaction data of a transaction. For example, the transaction identified at operation 605 can be a just completed transaction. At operation 610, the cryptographic engine 240 generates a cryptographic entry from the transaction data as described above (e.g., using AES-CTR to generate ciphertext values, and/or using the asymmetric key pair to encrypt the agent identifier and the payment account item).

At operation 615, the interface engine 210 receives a query from a user conducting an investigation of potential fraud. For example, the investigator 360 submits query 365 requesting cryptographic entry 340A, and in particular, the agent identifier and additional items of transactional data (e.g., shipping address of end user) useful for investigation. At operation 620, the cryptographic engine 240 selectively exposes the requested values by XOR'ing the ciphertexts with their respective scramble values to generate the message texts. At operation 625, the interface engine 210 transmits the message texts for display to the user that submitted the query. For example, the interface engine 210 causes a user interface display on the client device 110 of the investigator 360, wherein the user interface displays the query results of operations 375 and 380.

Figure 6B:
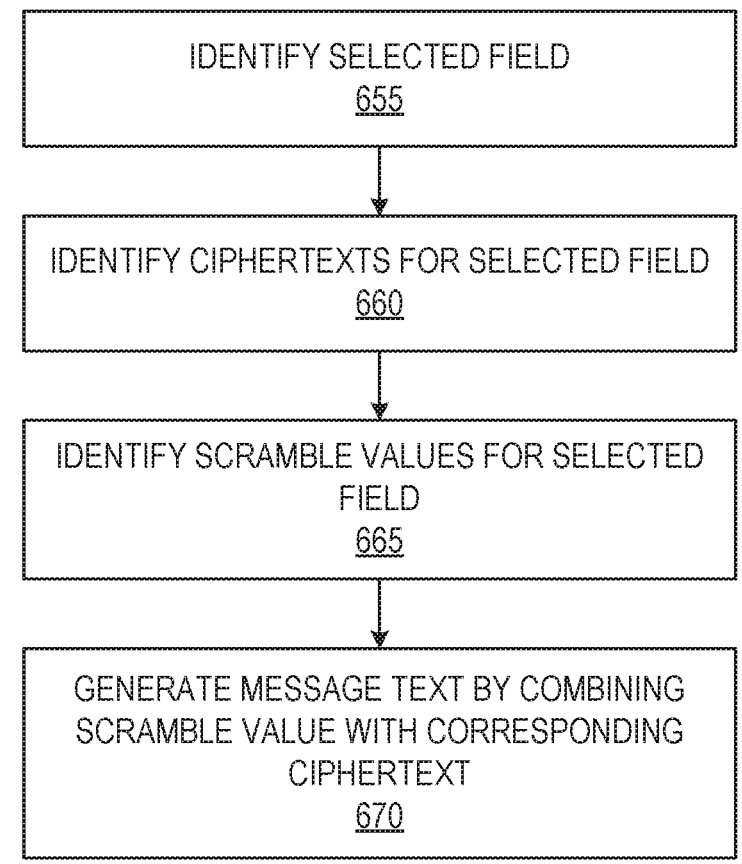
FIG. 6B illustrates a flow diagram for a method implementing securely exposing data, according to some example embodiments.

FIG. 6B illustrates a flow diagram for a method 650 for generating the message texts, according to some example embodiments. In particular, for example, the method 650 can be a subroutine of operations performed to complete operation 620 of FIG. 6A in which message texts are generated. At operation 655, the fields selected for decryption are identified. For example, the user 106 may have individually authorized the encrypted item data C0 (FIG. 5A) to be decrypted. At operation 660, the cryptographic engine 240 identifies the ciphertext for the selected field (e.g., ciphertext C0 in FIG. 5A). At operation 665, the cryptographic engine 240 identifies scramble values for the selected field. For example, the cryptographic engine 240 identifies the scramble value S0, illustrated in FIG. 5A. At operation 670, the cryptographic engine 240 generates the message text by combining the scramble value with the ciphertext value using a XOR operation. For example, the cryptographic engine 240 XOR's the ciphertext C0 with its scramble value, S0, to generate the message text, M0, which is a plaintext description of the item in the cryptographic entry. Although only a single field is discussed in method 650, it is appreciated that multiple fields can be processed in a similar manner. For example, message texts M0, M1, and M2 can be exposed by XOR'ing ciphertexts C0, C1, and C2 with scramble values S0, S1, and S2, respectively.

Figure 7:
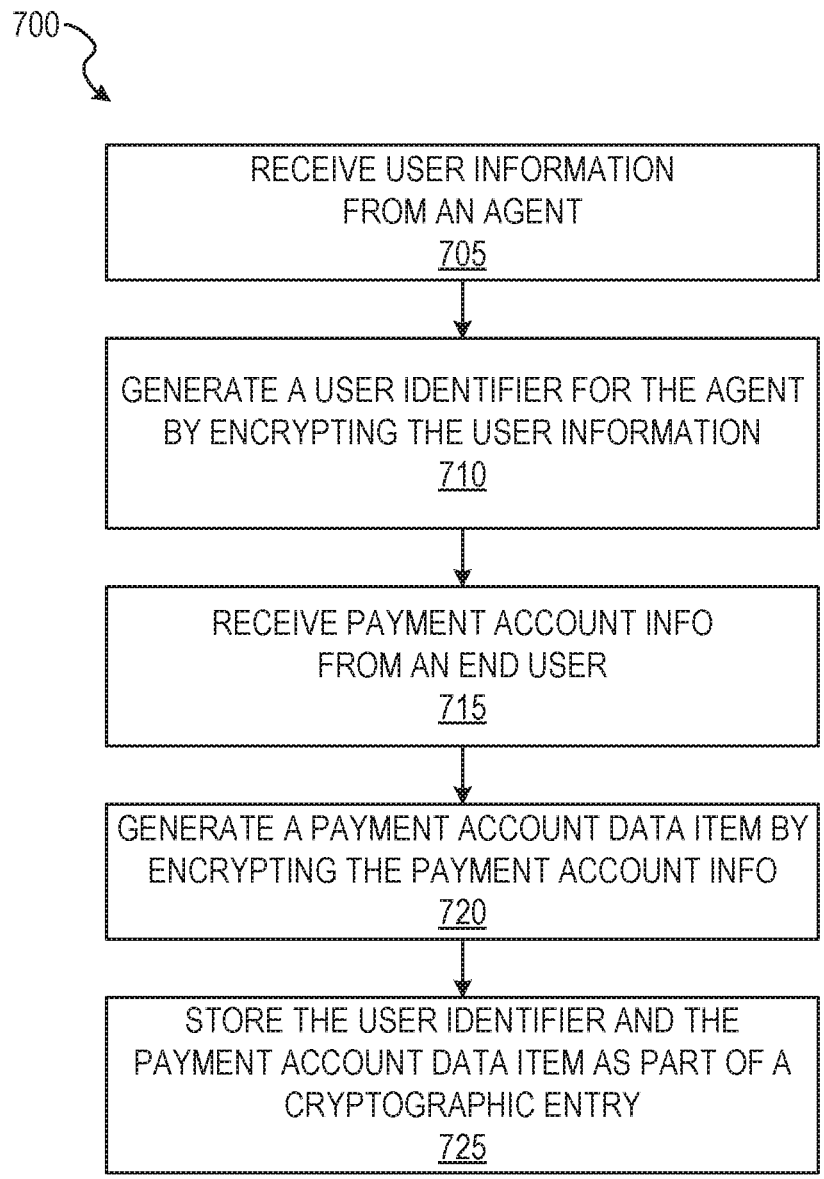
FIG. 7 illustrates a flow diagram for generating an encrypted user identifier and payment account data item, according to some example embodiments.

FIG. 7 illustrates a flow diagram 700 for generating an encrypted user identifier and a payment account data item, according to some example embodiments. At operation 705, the interface engine 210 receives user information from the agent 315. For example, at operation 705, the interface engine 210 receives the social security number from agent 315.

At operation 710, the cryptographic engine 240 generates a user identifier by encrypting the user information using an encryption scheme. For example, at operation 710, the cryptographic engine 240 encrypts the SSN of the agent 315 with the private key of an asymmetric key pair to generate a ciphertext that acts as an identifier for the agent 315.

At operation 715, the interface engine 210 receives sensitive end-user data from the end user. For example, at operation 715, the interface engine 210 receives payment account information, such as a CVC, from the end-user.

At operation 720, the cryptographic engine 240 generates a payment account data item by encrypting the payment account information. For example, at operation 720, the cryptographic engine 240 encrypts the end-user's CVC with the public key of the asymmetric key pair to generate a ciphertext of the CVC, which serves as the payment account data item stored in the cryptographic entry. At operation 725, the database engine stores the user identifier and the payment account data item as part of a cryptographic entry in the database 126.

Although, as discussed above, some example embodiments implement an asymmetric key pair where each key encrypts one of the user identifier or payment account data item, it is appreciated that other encryption mechanisms can be used to generate the encrypted user identifier and the payment account data item. For instance, the user identifier (e.g., SSN) and the payment account data item (e.g., CVC) may be processed the same as the other items in the cryptographic entry. That is, the user identifier (e.g., SSN) and the payment account data item may not be encrypted using the asymmetric key pair, and instead may be encrypted using the AES-CTR mechanism that is used to encrypt the entire row. Alternatively, AES can be used to generate the encrypted agent identifier and the payment account data item using different encryption keys that are not part of a shared key pair, according to some example embodiments.

Figure 8:
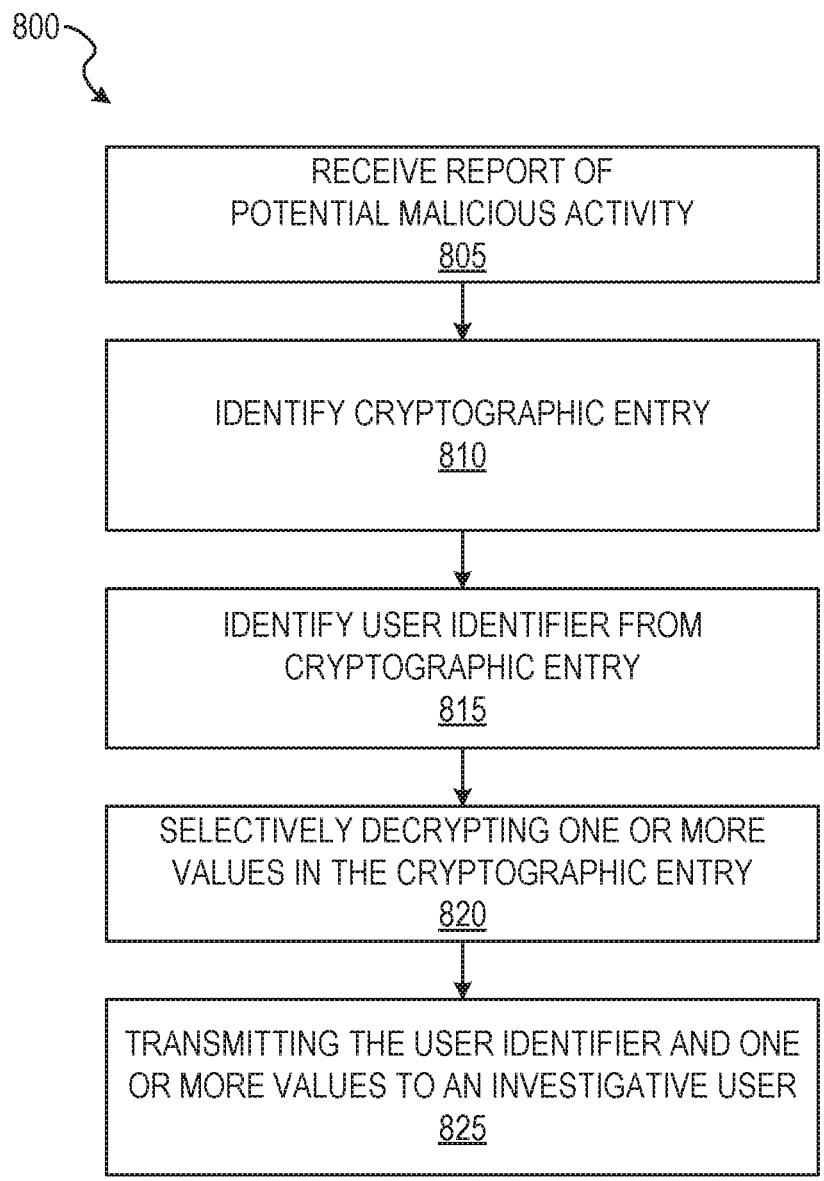
FIG. 8 illustrates a flow diagram for a method for managing notifications of potential malicious activity on a user's account, according to some example embodiments.

FIG. 8 illustrates a flow diagram 800 for a method for managing notifications of potential malicious activity (e.g., fraud) on an end-user's account, according to some example embodiments. At operation 805, a report of potential malicious activity is received from the end-user. For example, the end-user notices potential malicious activity on his/her account. For example, the end-user may notice his account balance is lower than it should be. The end user then sends a notification to the cryptographic fraud engine 150 describing the issue.

At operation 810, the cryptographic engine 240 identifies one or more cryptographic entries in which the user 106 is involved. For example, each of the one or more cryptographic entries may be for a different item transaction.

At operation 815, the cryptographic engine 240 identifies the one or more agent users listed in each transaction record by identifying their user identities (e.g., their encrypted social security numbers).

At operation 820, the cryptographic engine 240 selectively decrypts one or more values of the identified cryptographic entries. For example, the cryptographic engine 240 may use AES-CTR to expose transaction data and use asymmetric key pair encryption/decryption to expose the agent identifiers. At operation 825, the interface engine 210 transmits the user identifier and the one or more values in plaintext form to an investigative user for analysis.

Figure 9:
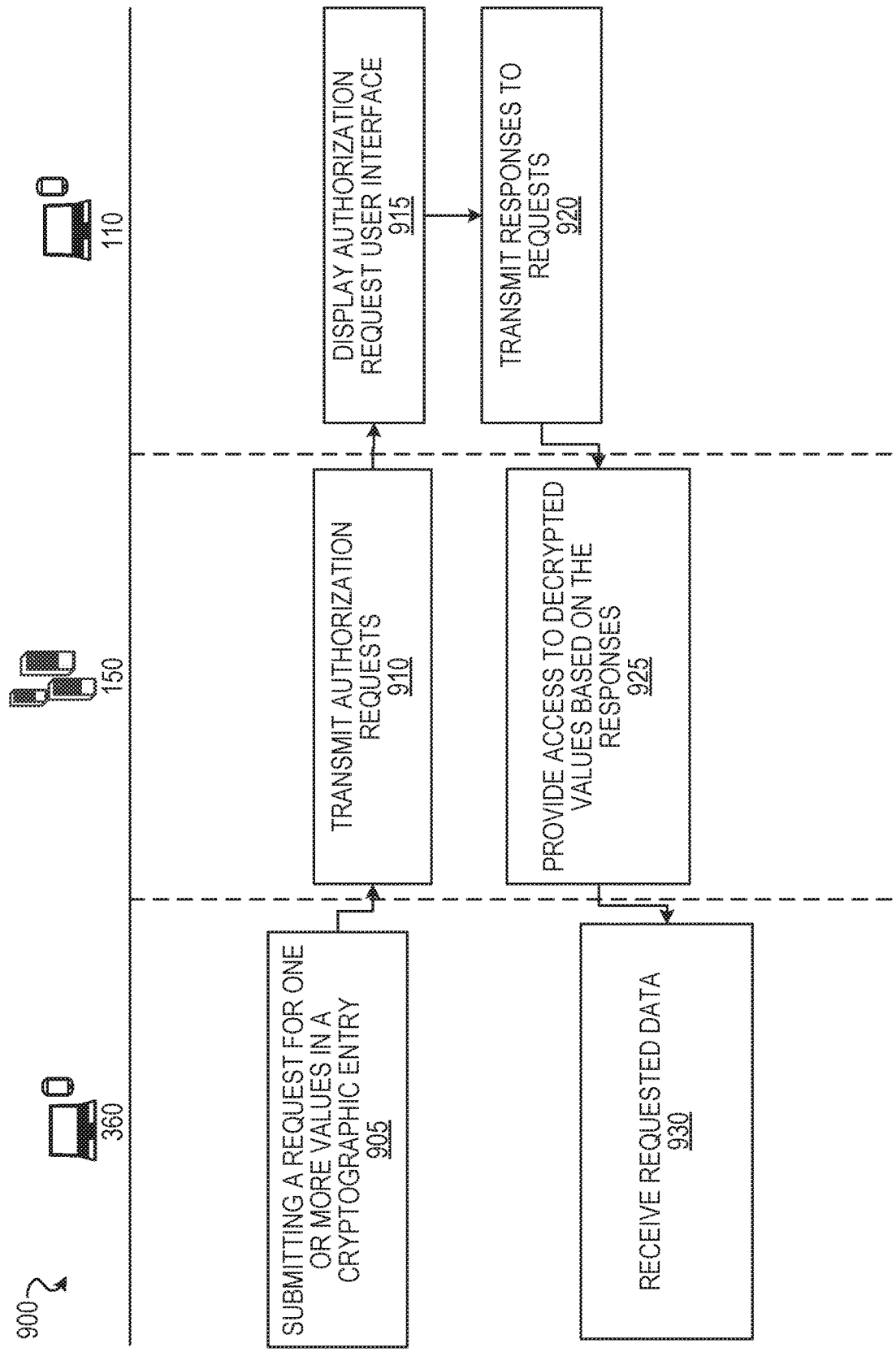
FIG. 9 illustrates an interaction diagram for authorization of selective decryption of one or more values in a cryptographic entry, according to some example embodiments.

FIG. 9 illustrates an interaction diagram 900 for authorization of selective decryption of one or more values in a cryptographic entry, according to some example embodiments. At operation 905, an investigator 360 submits, via their device, a request for one or more vales in a cryptographic entry. At operation 910, the cryptographic fraud engine 150 transmits the request for authorization to the client device 110. At operation 915, the client device 110 of the end-user 106 displays a user interface with display elements that allow the end-user 106 to authorize or deny exposing each of the requested values. For example, the investigative user 360 may request the item description, the price, and the shipping address for one or more transactions, and the end-user 106 may authorize decryption of the of the price and shipping address, but not the item description. At operation 920, the client device 110 transmits the response to the requests to the cryptographic fraud engine 150.

At operation 925, the cryptographic fraud engine 150 provides access to the data values in decrypted form based on which data values were authorized by the end-user 106. As an illustrative example, in some example embodiments, at operation 925, the cryptographic fraud engine 150 recovers the message texts by XOR'ing the scramble values with the ciphertexts. Alternatively, in some example embodiments, at operation 925 the scramble values are identified for the authorized values and sent to the investigator 360. That is, in some embodiments at operation 925 the values are decrypted, while in other example embodiments only the scramble values are identified.

At operation 930, the device of the investigative user 360 receives the requested data. Continuing the examples above, if the cryptographic fraud engine 150 exposes the message texts at the server side (e.g., within network 104), then at operation 930 the device of the investigator 360 receives the message texts in plaintext form (e.g., readable English). Alternatively, at operation 930, the device of the investigative user 360 receives scrambles values, and the investigator 360 can use the scramble values to XOR the ciphertexts to expose the message texts in plaintext form. In the examples above, to maintain security, the inputs into the encryption engine (e.g., initialization vector data, nonce data, counter data) need never leave the server-side (e.g., network 104), thereby maintaining the security and privacy of the end-user data in the cryptographic data structure 400.

Certain embodiments are described herein as including logic or a number of components, modules, or mechanisms. Modules can constitute either software modules (e.g., code embodied on a machine-readable medium) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) can be configured by software (e.g., an application or application portion) as a hardware module that operates to perform certain operations as described herein.

In some embodiments, a hardware module can be implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an application specific integrated circuit (ASIC). A hardware module may also include programmable logic or circuitry that is temporarily configured by software to perform certain operations. For example, a hardware module can include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network 104 (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules can be located in a single geographic location (e.g., within a home environment, an office environment, or a server farm). In other example embodiments, the processors or processor-implemented modules are distributed across a number of geographic locations.

The modules, methods, applications and so forth described in conjunction with FIGS. 1-9 are implemented in some embodiments in the context of a machine and an associated software architecture. The sections below describe representative software architecture and machine (e.g., hardware) architecture that are suitable for use with the disclosed embodiments.

Figure 10:
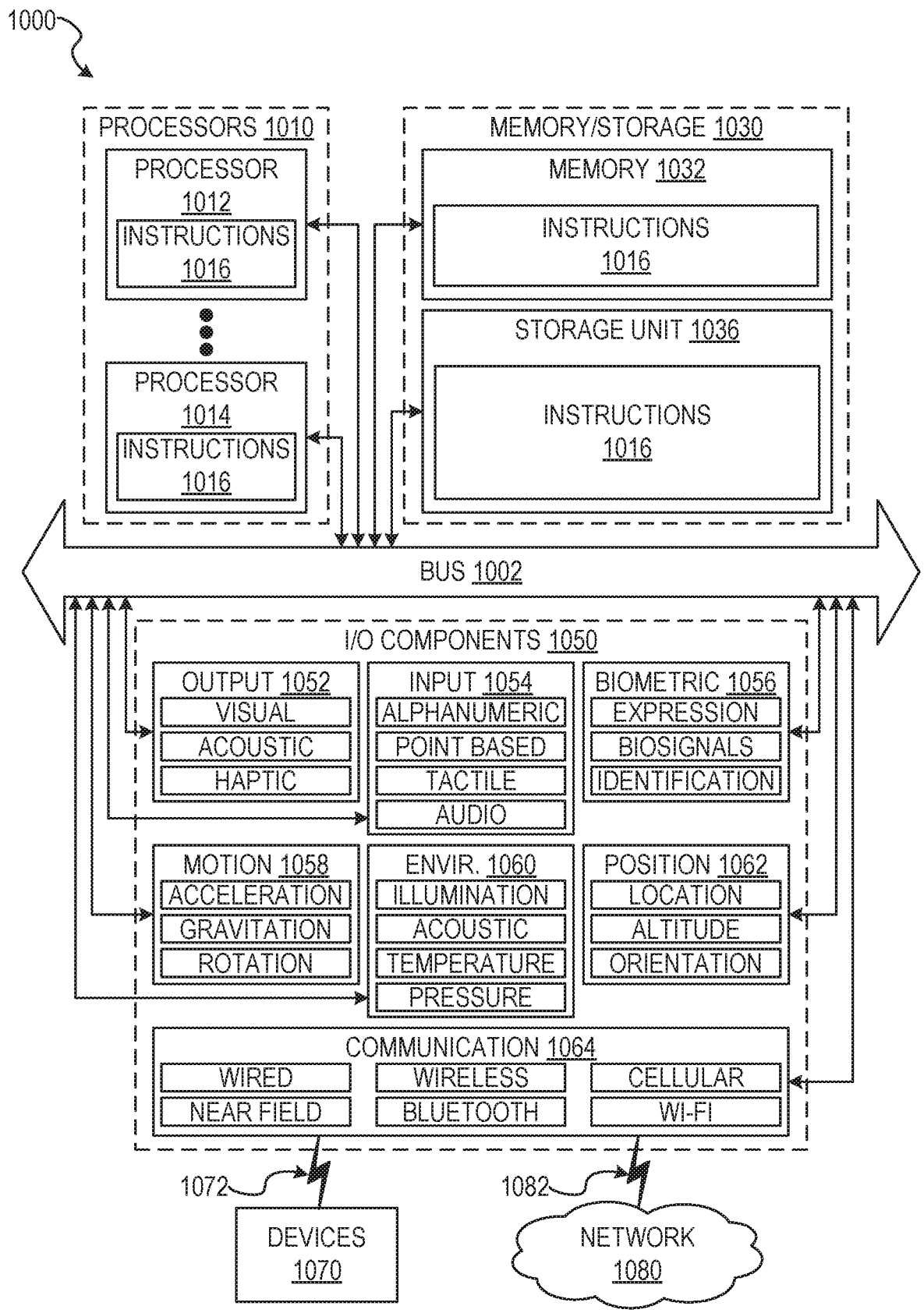
FIG. 10 illustrates a diagrammatic representation of a machine in the form of a computer system within which a set of instructions may be executed for causing the machine to perform any one or more of the methodologies discussed herein, according to an example embodiment.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein can be executed. For example, the instructions 1016 can cause the machine 1000 to execute the flow diagrams of FIGS. 6-9. Additionally, or alternatively, the instructions 1016 can implement the interface engine 210, transaction engine 220, cryptographic engine 240, and the database engine 250 of FIG. 2, and so forth. The instructions 1016 transform the general, non-programmed machine 1000 into a particular machine specially configured to carry out the described and illustrated functions in the manner described. In alternative embodiments, the machine 1000 operates as a standalone device or can be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 can include processors 1010, memory/storage 1030, and I/O components 1050, which can be configured to communicate with each other such as via a bus 1002. In an example embodiment, the processors 1010 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) can include, for example, processor 1012 and processor 1014 that may execute instructions 1016. The term "processor" is intended to include multi-core processors that may comprise two or more independent processors (sometimes referred to as "cores") that can execute instructions 1016 contemporaneously. Although FIG. 10 shows multiple processors 1010, the machine 1000 may include a single processor with a single core, a single processor with multiple cores (e.g., a multi-core processor), multiple processors with a single core, multiple processors with multiples cores, or any combination thereof.

The memory/storage 1030 can include a memory 1032, such as a main memory, or other memory storage, and a storage unit 1036, both accessible to the processors 1010 such as via the bus 1002. The storage unit 1036 and memory 1032 store the instructions 1016 embodying any one or more of the methodologies or functions described herein. The instructions 1016 can also reside, completely or partially, within the memory 1032, within the storage unit 1036, within at least one of the processors 1010 (e.g., within the processor's cache memory), or any suitable combination thereof, during execution thereof by the machine 1000. Accordingly, the memory 1032, the storage unit 1036, and the memory of the processors 1010 are examples of machine-readable media.

As used herein, the term "machine-readable medium" means a device able to store instructions 1016 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)) or any suitable combination thereof. The term "machine-readable medium" should be taken to include a single medium or multiple media (e.g., a centralized or distributed database, or associated caches and servers) able to store instructions 1016. The term "machine-readable medium" shall also be taken to include any medium, or combination of multiple media, that is capable of storing instructions (e.g., instructions 1016) for execution by a machine (e.g., machine 1000), such that the instructions 1016, when executed by one or more processors of the machine 1000 (e.g., processors 1010), cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se. The "machine-readable medium" may also be referred to as a "machine-readable storage device" or simply a "hardware storage device."

The I/O components 1050 can include a wide variety of components to receive input, provide output, produce output, transmit information, exchange information, capture measurements, and so on. The specific I/O components 1050 that are included in a particular machine will depend on the type of machine. For example, portable machines such as mobile phones will likely include a touch input device or other such input mechanisms, while a headless server machine will likely not include such a touch input device. It will be appreciated that the I/O components 1050 can include many other components that are not shown in FIG. 10. The I/O components 1050 are grouped according to functionality merely for simplifying the following discussion, and the grouping is in no way limiting. In various example embodiments, the I/O components 1050 can include output components 1052 and input components 1054. The output components 1052 can include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1054 can include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In further example embodiments, the I/O components 1050 can include biometric components 1056, motion components 1058, environmental components 1060, or position components 1062 among a wide array of other components. For example, the biometric components 1056 can include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1058 can include acceleration sensor components (e.g., an accelerometer), gravitation sensor components, rotation sensor components (e.g., a gyroscope), and so forth. The environmental components 1060 can include, for example, illumination sensor components (e.g., a photometer), temperature sensor components (e.g., one or more thermometers that detect ambient temperature), humidity sensor components, pressure sensor components (e.g., a barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1062 can include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 include a network interface component or other suitable device to interface with the network 1080. In further examples, communication components 1064 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 1070 may be another machine or any of a wide variety of peripheral devices (e.g., a peripheral device coupled via a Universal Serial Bus (USB)).

Moreover, the communication components 1064 can detect identifiers or include components operable to detect identifiers. For example, the communication components 1064 can include radio frequency identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1064, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 1080 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or other type of cellular or wireless coupling. In this example, the coupling 1082 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1016 can be transmitted or received over the network 1080 using a transmission medium via a network interface device (e.g., a network interface component included in the communication components 1064) and utilizing any one of a number of well-known transfer protocols (e.g., Hypertext Transfer Protocol (HTTP)). Similarly, the instructions 1016 can be transmitted or received using a transmission medium via the coupling 1072 (e.g., a peer-to-peer coupling) to devices 1070. The term "transmission medium" shall be taken to include any intangible medium that is capable of storing, encoding, or carrying the instructions 1016 for execution by the machine 1000, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   identifying an identifier of a first user and a data item associated with a second user;
   encrypting the identifier using a private key of an asymmetric key pair and the data item using a public key of the asymmetric key pair;
   receiving transaction data associated with the first user and the second user;
   generating a cryptographic entry using the transaction data, the cryptographic entry including the identifier encrypted using the private key of the asymmetric key pair, the data item encrypted using the public key of the asymmetric key pair, and the transaction data;
   encrypting the cryptographic entry using a counter mode block cipher;
   storing the cryptographic entry in a data structure;
   receiving a request for one or more data values of the cryptographic entry in the data structure;
   applying an operation to selectively expose the one or more data values of the cryptographic entry in the data structure; and
   causing a display of the one or more data values on a display device.

2. The method of claim 1, further comprising:
   receiving, from a third user, the request for the one or more data values, wherein the request specifies the one or more data values.

3. The method of claim 2, wherein the one or more data values are selectively exposed and the display is transmitted to the third user in response to receiving the request from the third user.

4. The method of claim 1, further comprising:
   receiving, from the second user, authorization to expose the one or more data values.

5. The method of claim 1, wherein the data input into the counter mode block cipher includes a nonce.

6. The method of claim 1, wherein a block counter increments for each block of the counter mode block cipher.

7. The method of claim 1, where the data structure comprises a plurality of cryptographic entries, each of which uses a different nonce in the counter mode block cipher.

8. The method of claim 1, wherein the operation is a XOR operation.

9. The method of claim 1, further comprising:
receiving, from the first user, a social security number of the first user; and
generating the identifier by encrypting the social security number using the private key.

10. The method of claim 1, further comprising:
receiving, from the second user, the data item; and
encrypting the data item using the public key.

11. The method of claim 2, further comprising:
in response to receiving the request, transmitting, to the second user, a set of authorization requests for authorization to expose the one or more values, each authorization request of the set of authorization requests requesting authorization to expose an individual value of the one or more values;
receiving, from the second user, one or more responses to the set of authorization requests; and
based on the one or more responses, exposing the one or more values and transmitting, to the third user, the display of the one or more values.

12. The method of claim 2, further comprising:
transmitting, to the second user, an additional request for authorization to expose the one or more values;
receiving, from the second user, a response to the request for authorization; and
based on the response, exposing the one or more values and transmitting the display of the one or more values to the third user.

13. The method of claim 1, further comprising:
decrypting the identifier of the first user; and
transmitting the identifier in decrypted form to a third user.

14. A system comprising:
one or more processors of a machine; and
a memory comprising instructions that, when executed by the one or more processors, cause the machine to perform operations comprising:
identifying an identifier of a first user and a data item associated with a second user;
encrypting the identifier using a private key of an asymmetric key pair and the data item using a public key of the asymmetric key pair;
receiving transaction data associated with the first user and the second user;
generating a cryptographic entry using the transaction data, the cryptographic entry including the identifier encrypted using the private key of the asymmetric key pair, the data item encrypted using the public key of the asymmetric key pair, and the transaction data;
encrypting the cryptographic entry using a counter mode block cipher;
storing the cryptographic entry in a data structure;
receiving a request for one or more data values of the cryptographic entry in the data structure;
applying an operation to selectively expose the one or more data values of the cryptographic entry in the data structure; and
causing a display of the one or more data values on a display device.

15. The system of claim 14, the operations further comprising:
receiving, from a third user, the request for the one or more data values, wherein the request specifies the one or more data values.

16. The system of claim 15, wherein the one or more data values are selectively exposed and the display of the one or more values is transmitted to the third user in response to receiving the request from the third user.

17. The system of claim 14, the operations further comprising:
receiving, from the second user, authorization to expose the one or more data values.

18. The system of claim 14, wherein a block counter increments for each block of the counter mode block cipher.

19. The system of claim 14, wherein the operation is a XOR operation.

20. A non-transitory computer readable storage medium comprising instructions that, when executed by one or more processors of a device, cause the device to perform operations comprising
identifying an identifier of a first user and a data item associated with a second user;
encrypting the identifier using a private key of an asymmetric key pair and the data item using a public key of the asymmetric key pair;
receiving transaction data associated with the first user and the second user;
generating a cryptographic entry using the transaction data, the cryptographic entry including the identifier encrypted using the private key of the asymmetric key pair, the data item encrypted using the public key of the asymmetric key pair, and the transaction data;
encrypting the cryptographic entry using a counter mode block cipher;
storing the cryptographic entry in a data structure;
receiving a request for one or more data values of the cryptographic entry in the data structure;
applying an operation to selectively expose the one or more data values of the cryptographic entry in the data structure; and
causing a display of the one or more data values on a display device.

* * * * *